United States Patent [19]

Kamiyama et al.

[11] Patent Number: 4,808,355
[45] Date of Patent: Feb. 28, 1989

[54] METHOD OF CHANGING THE RESIN IN AN INJECTION MOLDING MACHINE USING A NOZZLE TOUCH PLATE

[75] Inventors: Takashi Kamiyama; Osamu Segawa; Mitsuaki Eshima, all of Numazu, Japan

[73] Assignee: Toshiba Kikai Kabushiki Kaisha, Tokyo, Japan

[21] Appl. No.: 193,132

[22] Filed: May 5, 1988

Related U.S. Application Data

[63] Continuation of Ser. No. 903,216, Sep. 2, 1986, abandoned.

[30] Foreign Application Priority Data

Sep. 9, 1985 [JP] Japan .......................... 60-137890[U]

[51] Int. Cl.$^4$ .............................................. B29C 45/24
[52] U.S. Cl. ............................... 264/39; 264/328.11; 425/190; 425/226; 425/574
[58] Field of Search ............... 425/182, 185, 190, 225, 425/226, 228, 229, 230, 542, 562, 574; 264/39, 328.1, 328.11

[56] References Cited

U.S. PATENT DOCUMENTS

| 2,102,328 | 12/1937 | Morin | 264/39 |
| 4,472,127 | 9/1984 | Cyriax et al. | 425/190 |

FOREIGN PATENT DOCUMENTS

| 1432150 | 12/1966 | France | 425/574 |
| 57-191030 | 11/1982 | Japan | 264/39 |

Primary Examiner—Jan H. Silbaugh
Assistant Examiner—Jill L. Heitbrink
Attorney, Agent, or Firm—Koda and Androlia

[57] ABSTRACT

For an injection molding machine a nozzle touch plate is provided which is slidable on a surface of a stationary plate opposite to the surface to which a metal mold is secured. The nozzle touch plate is brought to a position for preventing advancement of an injection nozzle into contact with the metal mold. In this position, the injection nozzle is brought into contact with the nozzle touch plate so that resin remaining in the injection cylinder is purged against the plate at the time of changing the type or color of the resin whereby the resin is prevented from being injected into the metal mold. After purging the nozzle touch plate is retracted to permit injection molding of new resin.

1 Claim, 1 Drawing Sheet

METHOD OF CHANGING THE RESIN IN AN INJECTION MOLDING MACHINE USING A NOZZLE TOUCH PLATE

This is a continuation of application Ser. No. 903,216, filed Sep. 2, 1986, now abandoned.

BACKGROUND OF THE INVENTION

This invention relates to an injection molding machine and, more particularly, to a nozzle touch plate for use in the injection molding machine against which the injection nozzle of the machine touches at the time when the type or color of the resin is changed.

In a prior art injection molding machine, at the time of changing the type or color of the resin the injection nozzle is brought into contact with a metal mold for applying the back pressure in a heating cylinder. This method, however, involves the following problems.

(1) It is necessary to set the metal mold into the injection machine.

(2) A long operation time is necessary for repeating an injection operation (purging) and retraction of the injection nozzle for the purpose of nozzle touch and changing the type or color of the resin.

(3) Since during the purging operation the metal mold is used, it is impossible to change the metal mold.

(4) Since the metal mold is used, and the resin is injected into the mold, it is necessary to remove the resin from the metal mold.

(5) Depending upon the types of the metal mold and the resin, in a certain case it is impossible to apply a high back pressure.

SUMMARY OF THE INVENTION

Accordingly, it is an object of this invention to provide an injection molding machine utilizing an improved nozzle touch plate capable of obviating various problems described above.

More specific object of this invention is to provide an improved nozzle touch plate for use in an injection molding machine capable of preventing injection of the resin into the metal mold and reducing the stroke of the injection nozzle at the time of changing the type or color of the resin.

According to this invention, there is provided an injection molding machine comprising a stationary plate, a metal mold mounted on one side of the stationary plate, and an injection nozzle of an injection cylinder reciprocated toward and away from said metal mold, charcterized by a nozzle touch plate provided for the other side of the stationary plate to be movable in a direction perpendicular to the direction of reciprocation of the injection nozzle.

DESCRIPTION OF THE PREFERRED EMBODIMENT

Figure 1:
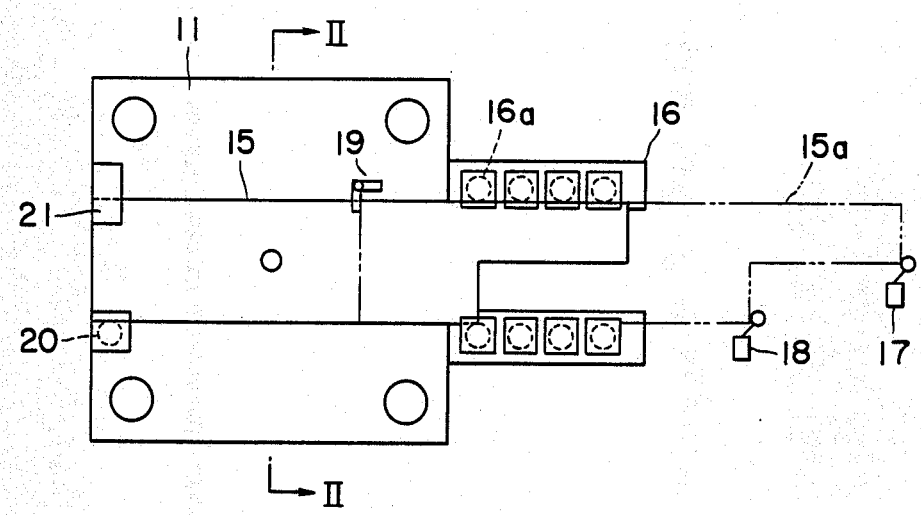
FIG. 1 is a front view of one embodiment of this invention.
Figure 2:
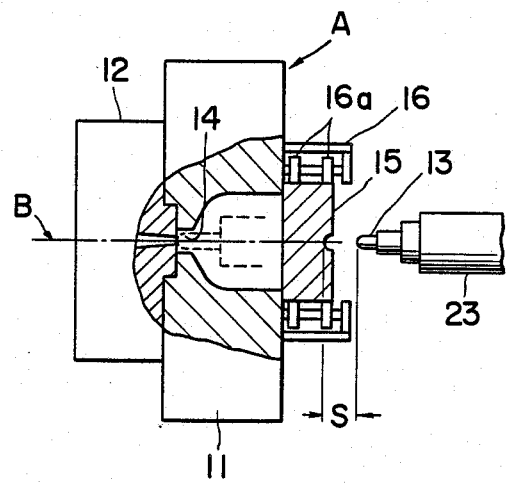
FIG. 2 is a sectional view taken along a line II—II in FIG. 1.

Referring now to FIGS. 1 and 2, a metal mold 12 is mounted on one surface of a stationary plate 11 and a nozzle touch plate 15 is mounted on the other surface A of the stationary plate 11 only when the type or color of the resin is changed. The nozzle touch plate 15 is moved from a retracted position shown by dot and dash lines to an advanced position shown by solid lines in a direction perpendicular to a line B interconnecting an injection nozzle 13 and a resin pouring port 14 of the metal mold 12.

For guiding the reciprocating movement of the nozzle touch plate 15, a roller unit 16 including a plurality of rollers (or a roller bearing) 16a is secured to the surface A of the stationary plate 11.

Although the nozzle touch plate 15 may be moved manually, it is more advantageous to move it with an air cylinder or an oil pressure cylinder, not shown.

There are provided limit switches 17 and 18 which are actuated when the nozzle touch plate 15 is moved to its retracted position for producing electric signals utilized to control an air pressure cylinder or the like. An electromagnetic hook 19 may be provided for holding the nozzle touch plate in the retracted position. A guide roller 20 and a stop member 21 are provided for guiding and stopping the nozzle touch plate 15 when it is moved to the operating position shown in FIG. 1.

In operation, while the injection molding machine is operating with one type or color of resin, the nozzle touch plate 15 is retracted to the dot and dash line position shown in FIG. 1, so that the injection tip 13 can advance to the dotted line position shown in FIG. 2 for injecting the resin into the metal mold 12. However, at the time of changing the type or color of the resin it is necessary to purge the resin remaining in the injection cylinder 23. At this time the nozzle touch plate 15 is advanced to the position shown in FIGS. 1 and 2 to close the inlet port 14 and the injection nozzle is brought into contact with the nozzle touch plate. Consequently, the injection nozzle cannot advance into a cavity in the stationary plate and the old resin remaining in the injection cylinder is discharged to the outside of the metal mold against the nozzle touch plate. After filling a new resin in the injection cylinder 23 the nozzle touch plate 15 is retracted thus permitting the nozzle to inject the new resin into the metal mold. Consequently, not only the stroke and time of the injection nozzle at the time of using the nozzle touch plate can be reduced but also the back pressure in the injection cylinder can be readily and rapidly increased by the nozzle touch plate.

What is claimed is:

1. A method of controlling an injection molding machine comprising a stationary plate, a metal mold mounted on one side of said stationary plate, an injection nozzle of an injection cylinder reciprocated toward and away from said metal mold, and a nozzle touch plate provided on another side of said stationary plate to be movable in a direction perpendicular to the direction of reciprocation of said injection nozzle between a retracted position and an advanced position between said metal mold and said injection nozzle, said method comprising the steps of:

holding said touch plate at said retracted position during normal operation of said injection molding machine so as to permit said injection nozzle to inject a resin of one type into said metal mold; and then moving said touch plate to said advanced position and causing said injection nozzle to touch against said touch plate while changing the type of said resin increasing the backpressure in the injection cylinder when said injection nozzle engages against said touch plate.

* * * * *